United States Patent [19]
Dach et al.

[11] 3,780,601
[45] Dec. 25, 1973

[54] PLANET CARRIER FOR PLANETARY-GEAR TRANSMISSION

[75] Inventors: Hansjörg Dach; Karl Heinz Bordowsky; Manfred Bucksch, all of Friedrichshafen, Germany

[73] Assignee: ZF-Borg Warner GmbH Industriegebiet Sud, Friedrichshafen, Germany

[22] Filed: May 15, 1972

[21] Appl. No.: 253,439

[30] Foreign Application Priority Data
May 14, 1971 Germany.................. P 21 24 009.5

[52] U.S. Cl...................... 74/762, 74/750 R, 74/801
[51] Int. Cl. ...... F16h 57/10, F16h 3/44, F16h 1/28
[58] Field of Search.................. 74/762, 763, 750 R, 74/801, 789

[56] References Cited
UNITED STATES PATENTS

| | | |
|---|---|---|
| 2,544,543 | 3/1951 | Porter................................... 74/789 |
| 2,923,166 | 2/1960 | Brindley et al. .................... 74/230.5 |
| 3,147,642 | 9/1964 | Erwin.................................... 74/759 |
| 3,470,770 | 10/1969 | Fisher .............................. 74/763 X |
| 3,527,121 | 9/1970 | Moore .............................. 74/801 X |
| 3,587,347 | 6/1971 | Hanzi................................... 74/759 |
| 3,667,324 | 6/1972 | Laing............................ 74/750 R X |

*Primary Examiner*—Arthur T. McKeon
*Attorney*—Karl F. Ross et al.

[57] ABSTRACT

A planet carrier mounted on a central shaft, in a transmission housing, comprises a disk with a toothed periphery matingly engaged by the complementarily crenellated periphery of a drum coaxial therewith, the drum serving as a support for a set of annular clutch or brake foils which are interleaved with similar foils on the surrounding housing. Several segments of the disk periphery are partly severed from the disk body to form tongues which are bent out of the disk plane toward the interior of the drum and are locked in place by radially inbent portions of the drum periphery.

10 Claims, 5 Drawing Figures

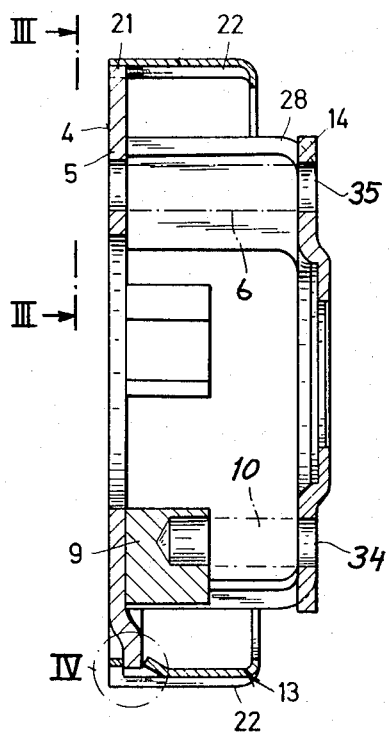
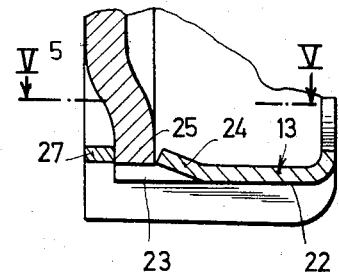
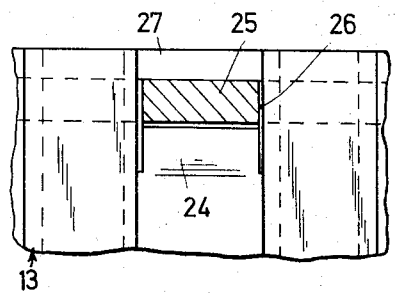
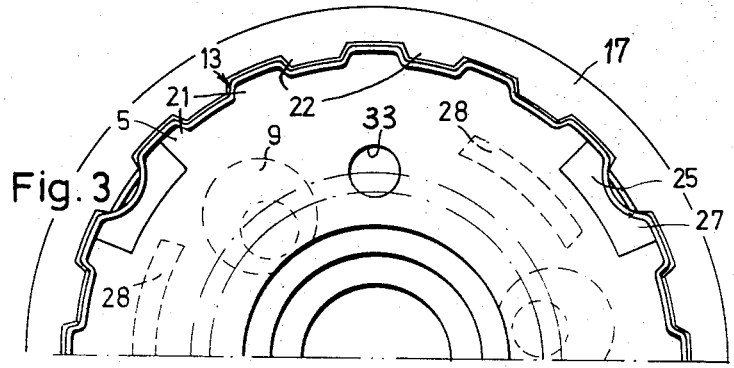

PLANET CARRIER FOR PLANETARY-GEAR TRANSMISSION

Our present invention relates to a planet carrier for a planetary-gear train of the type conventionally used in automotive transmissions, e.g., as described in U.S. Pat. Nos. 3,580,109, 3,592,082, 3,593,599 and 3,600,975.

In such transmissions, as discussed in the above-identified patents, it is necessary under certain driving conditions to couple the planet carrier to an adjoining component (e.g., another planet carrier or a transmission housing) by a fluid-operated device acting either as a clutch or as a brake.

The general object of our present invention is to provide a planet carrier of simple and compact construction which, in addition to fulfilling its normal function of supporting one or more off-axial pinions, also serves as a mounting for a set of annular friction members forming part of a clutch or brake as discussed above.

A more particular object is to provide a planet carrier adapted to be manufactured with little or no machining, e.g., by deep-drawing from sheet metal or by sinter casting, and which is easy to assemble or disassemble (as for replacing a worn pinion).

These objects are realized, in accordance with our present invention, by dividing the planet carrier into two separately manufactured but positively interconnected members, i.e., a first member with a generally disk-shaped body centered on an axis and a generally cylindrical second member coaxially enveloping the first member, this second member serving as a support for the frictional coupling means operable to immobilize the planet carrier with reference to an adjoining component. The first member, supporting the pinion or pinions, is provided with outer peripheral formations such as a set of teeth matingly engaging complementary inner peripheral formations of the second member, such as ribs and grooves, whereby the two members can be axially interfitted for positive rotary entrainment of one by the other. The ribs and grooves formed on the inner peripheral surface of the second member, referred to hereinafter as a drum, advantageously are part of a crenellated profile whose inward projections can be further deformed to bracket respective peripheral segments of the disk-shaped body of the first member, thereby positively locking the drum and the disk against relative axial displacement. The same crenellated profile also forms ribs and grooves on the outer peripheral drum surface, these latter formations serving for the axial guidance of the preferably foil-shaped annular friction members mounted thereon.

The first member may also include a mounting ring, axially spaced from its toothed disk, to serve as a counterbearing for the axles of pinions disposed therebetween. This mounting ring may be secured (preferably detachably) to the disk by several peripherally spaced spider legs between which the pinions, or some of them, may radially project for engagement by an associated ring gear. Depending on the type of planetary gearing required, the pinions may all be of the same axial length or of different lengths; in the latter instance, the shorter pinion or pinions may mesh with the longer ones to serve as reversing gears in transmitting the rotation of a sun gear on an associated power shaft to the ring gear.

The above and other features of our invention will be described in detail hereinafter with reference to the accompanying drawing in which:

FIG. 2 is an axial sectional view of the planet carrier shown in FIG. 1;

FIG. 3 is a face view of the upper half of the planet carrier as seen from line III — III of FIG. 2;

FIG. 4 is a sectional detail view of the area circled at IV in FIG. 2; and

FIG. 5 is a cross-sectional view taken on the line V — V of FIG. 4.

Figure 1:
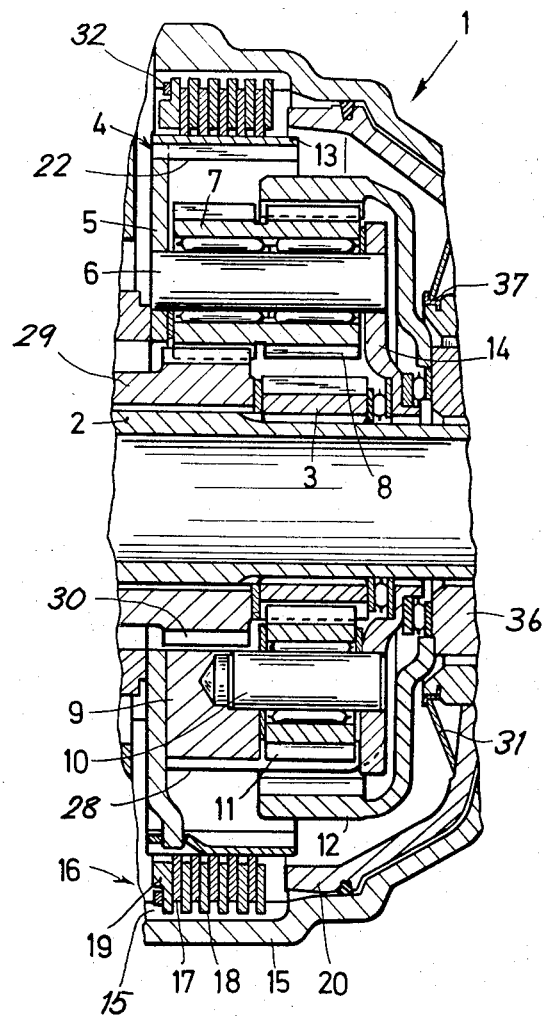
FIG. 1 is an axial sectional view of part of a planetary gearing including a planet carrier according to our invention.

In FIG. 1 we have shown a planetary-gear train 1 comprising a sun gear 3 keyed to a central power shaft 2, a ring gear 12 freely rotatable on that shaft and a planet carrier 4 supporting a set of dual pinions 7, 8 and a set of single pinions 11 each meshing with an associated pinion 8; shaft 2 is surrounded by a tubular power shaft 29 integral with another sun gear 30, gears 30 and 3 being in driving engagement with pinions 7 and 11, respectively. Pinions 8 mesh with ring gear 12 so that the latter can be rotated in either of two directions, from the codirectionally rotating shafts 2 and 29, if either of these shafts is operatively coupled to an associated drive shaft under the control of a respective clutch not shown; such a clutch assembly has been disclosed in our application Ser. No. 253,440 of even date.

Planet carrier 4 comprises a disk-shaped body 5, more clearly seen in FIGS. 2 and 3, with peripheral teeth 21 matingly engaging between inner ribs 22 of a drum 13 whose crenellated periphery also serves for the axial guidance of annular foils 17 of friction material interleaved with similar foils 18 which are guided by ribs 15' on the inner surfaces of a surrounding transmission housing 15. A piston 20, biased toward the right by a Belleville spring 31, is displaceable by pneumatic or hydraulic pressure to bear upon the stack of foils 17, 18, driving them against a stop 32 in the form of a snap ring so as to immobilize the drum 13 with reference to the housing 15.

A mounting ring 14, traversed like disk 5 by the shaft 2 but located beyond the shaft 29, is fixedly secured to disk 5 by a plurality of spider legs 28 which may be integral extensions of the ring 14 and may be joined to the disk by friction welding so as to be readily separable therefrom. Interleaved with these spider legs 28 are a set of bosses 9, each also friction-welded or otherwise secured to disk 5, which support the axles 10 of pinions 11; the axles 6 of pinions 7, 8 are lodged in holes 33 of disk 5. The opposite ends of these axles are received in holes 34, 35 of mounting ring 14.

In order to lock the disk 5 against axial displacement relative to drum 13, certain peripherally spaced segments 25 of the disk are bent out of its plane as illustrated in FIGS. 4 and 5. These segments 25 are bracketed by inbent tongues 24, integral with corresponding ribs 22 of the drum surface, and by similarly inbent straps 27 (see also FIG. 3) also forming part of ribs 22. By virtue of the axial deformation of the segments 25, the outer face of disk 5 may be coplanar with the edge of drum 13 so as to provide the maximum space inside the drum for accommodating the pinions 7, 8, 11. If necessary members 5 and 13 can be readily disassembled by a reverse bending of the straps 27.

It will be apparent that piston 20 could also be used to couple the planet carrier 4 to the ring gear 12 if the stack of foils 17, 18 were disposed between the drum 13 and the ring gear in their region of overlap, with the outer foils 18 guided by ribs 22 and the inner foils 17 guided by similar ribs on the outer peripheral surface of ring gear 12.

Belleville spring 31 is detachably anchored to a central boss 36 of housing 15 by an abutment ring of generally S-shaped cross-section, split at one point or divided into several segments, which is retained by the surrounding spring in an annular groove of this boss as described and claimed in our concurrently filed application Ser. No. 253,438.

We claim:

1. A planet carrier for a planetary-gear transmission, comprising a first member with a generally disk-shaped body centered on an axis, a generally cylindrical second member coaxially enveloping said first member, coupling means on said Second member operable to immobilize the latter with reference to an adjoining component, and pinion means off-axially carried on said first member; said body being provided with outer peripheral formations matingly engaged by inner peripheral formations of said second member whereby said members can be axially interfitted for positive rotary entrainment.

2. A planet carrier as defined in claim 1 wherein at least said second member is provided with deformed peripheral portions locking same against axial displacement relative to said first member.

3. A planet carrier as defined in claim 2 wherein said outer and inner peripheral formations are a set of teeth on said body and complementary crenellations on said second member, said deformed peripheral portions including inbent parts of several inwardly projecting crenellations bracketing respective peripheral segments of said first member.

4. A planet carrier as defined in claim 3 wherein said body has an outer face substantially flush with a rim of said second member, said peripheral segments being tongues bent out of the plane of said outer face.

5. A planet carrier as defined in claim 4 wherein said inwardly projecting crenellations are partly cut away to accommodate the tips of said tongues.

6. A planet carrier as defined claim 1 wherein said first member further comprises a mounting ring parallel to and axially spaced from said body, said pinion means having an axle held at opposite ends by said body and by said mounting ring.

7. A planet carrier as defined in claim 6 wherein said first member is provided with spider legs rigidly interconnecting said body and said mounting ring at peripherally spaced locations.

8. A planet carrier as defined in claim 6 wherein said pinion means includes a set of longer pinions and a set of shorter pinions each meshing with a respective longer pinion.

9. A planet carrier as defined in claim 8 wherein said body is provided with a plurality of peripherally spaced bosses projecting toward said mounting ring, said shorter pinions having axles received at one end in said bosses.

10. A planet carrier as defined in claim 1 wherein said second member has a crenellated profile, said coupling means including axially shiftable annular friction means positively guided by said profile.

* * * * *

UNITED STATES PATENT OFFICE
CERTIFICATE OF CORRECTION

Patent No. 3,780,601　　　　　　　Dated 25 December 1973

Inventor(s) Hansjörg D A C H

It is certified that error appears in the above-identified patent and that said Letters Patent are hereby corrected as shown below:

In the heading, line [73], for the name of assignee read -- ZF-GETRIEBE GmbH, -- instead of "ZF-BORG WARNER GmbH,".

Signed and sealed this 8th day of October 1974.

(SEAL)
Attest:

McCOY M. GIBSON JR.　　　　　　　　C. MARSHALL DANN
Attesting Officer　　　　　　　　　Commissioner of Patents